Figure 1:
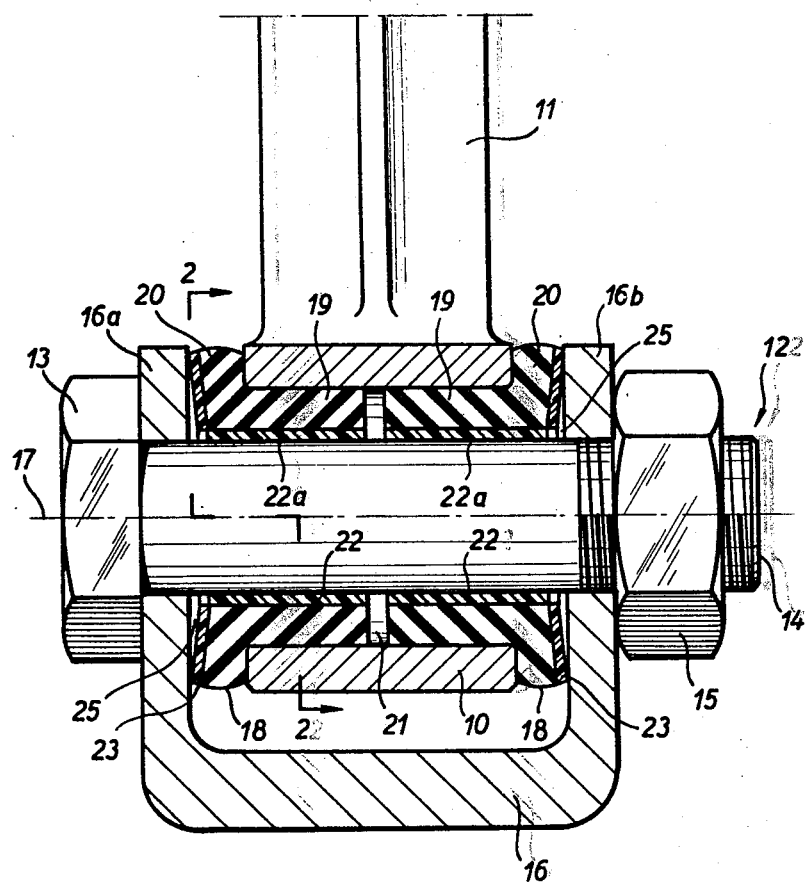

April 28, 1964  R. PIRAGINO  3,130,991
RESILIENT JOINTS, MORE PARTICULARLY FOR MOTOR VEHICLE SUSPENSION
Filed Jan. 30, 1962  4 Sheets-Sheet 1

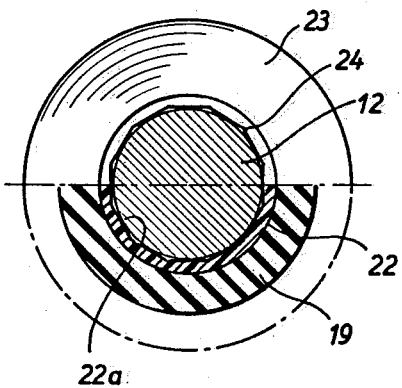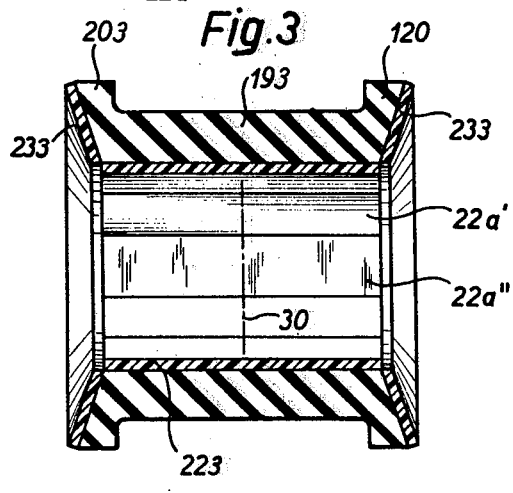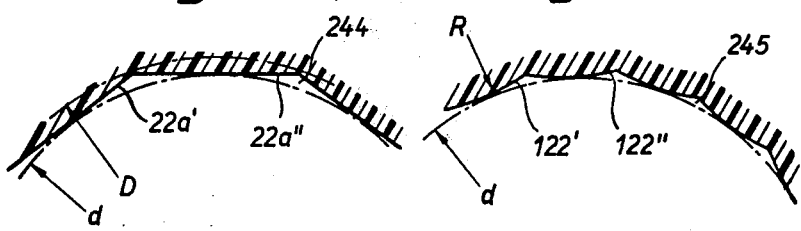

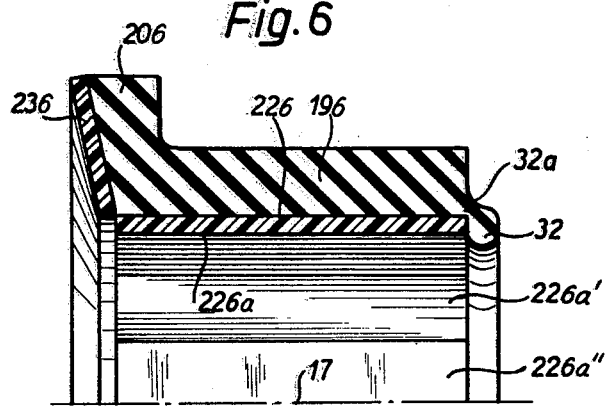
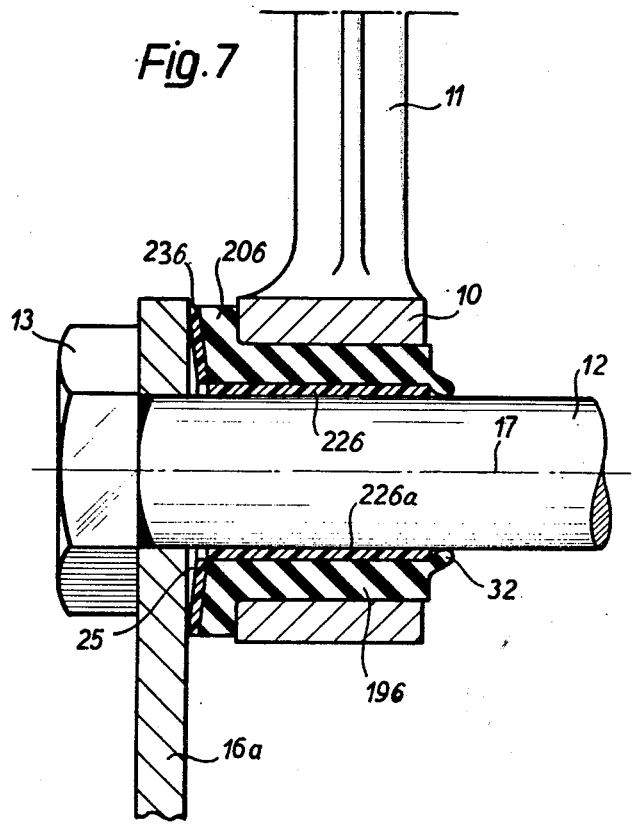

United States Patent Office 3,130,991
Patented Apr. 28, 1964

3,130,991
RESILIENT JOINTS, MORE PARTICULARLY FOR MOTOR VEHICLE SUSPENSION
Renato Piragino, Turin, Italy, assignor to RIV Officine di Villar Perosa Società per Azioni, Turin, Italy
Filed Jan. 30, 1962, Ser. No. 169,750
Claims priority, application Italy Feb. 7, 1961
7 Claims. (Cl. 287—85)

This invention relates to resilient joints, more particularly for motor vehicle suspensions, of the type sometimes referred to as sliding resilient joints, comprising a bushing having a sleeve of rubber or similar elastomer lined with a tubular layer of antifriction antiwear synthetic resin such as polyamide, polyfluorocarbon or the like.

In an articulation incorporating such a resilient joint having an eye-shaped member receiving the rubber sleeve and a circular-cylindrical pin inserted into the axial bore in the articulation, the pin is slidingly rotatable in the articulation so that angular movements of the articulation about the axis of the pin do not result in resilient reactions by the sleeve. In this connection advantage is taken of the self-lubricating and antiwear properties of the synthetic resin lining in sliding engagement with the pin.

Since such properties are never quite satisfactory or durable in practice, it was previously attempted to provide for additional lubrication of the surfaces in sliding interengagement by introducing therebetween a suitable lubricant (grease, graphite or the like) and by providing a supply of lubricant within suitable recesses in the elements of the articulation. Structures of this type known heretofore are not currently used, for the desired lubrication of the interengaging surfaces failed after a very short operational period.

The main object of this invention is to provide a resilient sliding self-lubricating joint of improved life, which obviates the abovementioned drawback.

According to this invention the inner surface of the tubular layer of synthetic resin is polygonal in cross sectional shape. The rubber sleeve has at least one flanged end having on its front or outward face an annular outwardly flaring layer of antifriction antiwear synthetic resin.

A joint of this type is employed in an articulation comprising an eye-shaped member having the said rubber sleeve forced thereinto, a circular-cylindrical pin rotatably inserted in the joint, the diameter of the pin being intermediate between the diameters of the circles inscribed in and circumscribed on the said polygonal section, respectively, of the resin layer, a lateral abutment on the said pin bearing on the outer circumferential region of the annular layer, and a lubricant in the clearance or space defined by the joint, pin and abutment.

Figure 8:
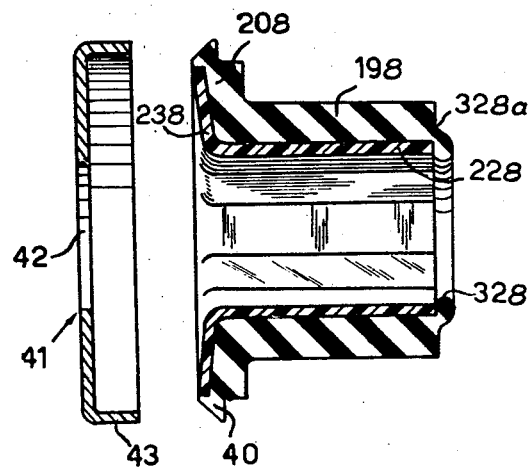
Figure 9:
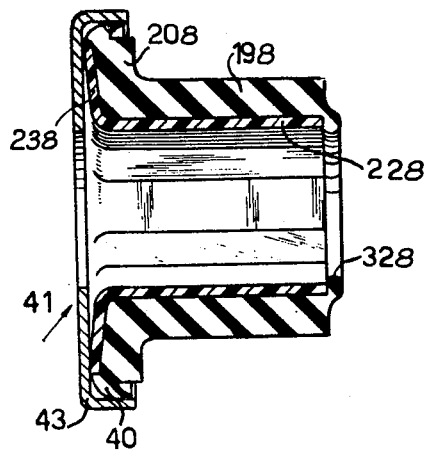

Further characteristic features, advantages and operation of the improved joint will be understood from the appended description referring to the accompanying drawing, wherein:

FIG. 1 is an axial sectional view of an articulation incorporating a pair of improved joints, FIG. 2 is a part cross sectional view on the broken line II—II of FIG. 1, FIG. 3 is an axial sectional view of one of the possible embodiments of the improved joint, FIGURES 4 and 5 show diagrammatically two preferred inner profiles of the improved joint, FIG. 6 is a part axial sectional view of a further embodiment, FIG. 7 is a sectional view similar to FIG. 1 showing an articulation including the joint according to FIG. 6, FIG. 8 is an exploded axial sectional view of a further embodiment, FIG. 9 is a similar sectional view of the joint according to FIG. 8 in its assembled condition.

In the figures, similar or equivalent parts are denoted by similar reference numerals in which the last digit denotes the figure in order to avoid a repeated description thereof.

Referring first to FIGS. 1 and 2, the articulation as shown comprises a first member having an aperture extending therethrough, for example one illustration or embodiment of the invention comprises a cylindrical eye-shaped member 10 on a connecting rod or link 11, coaxially arranged with a pin member 12 comprising a steel bolt having a head 13 and a screw threaded end 14 on which a nut 15 is screwed. The bolt 12 extends with an accurate fit through a pair of aligned circular apertures in abutments or branches 16a, 16b of a strap 16 articulated to the link 11 about the axis 17 of the bolt 12. The mutual spacing of the branches 16a, 16b of the strap 16 exceeds the axial length of the eye-shaped member 10.

Resiliency of the articulation is afforded by two resilient joints 18, 18 identical with each other, aligned on the axis 17. The joints each comprise a rubber sleeve 19 having at one end an integral radial flange 20. The two sleeves are forced in the opposite ends of the eye-shaped member 10, their axial length being such as to leave a central annular clearance 21 between their near ends when the flanges 20 bear on their associated front end surfaces on the member 10.

The sleeves 19 are each lined with a flexible tubular layer 22 of a polyamide resin, the front surface of the flanged end of each sleeve being outwardly flared and coated with a flexible annular layer 23 of similar resin copying the said flare. As will be seen in FIG. 1, the bore of the annulus 23 somewhat exceeds the diameter of the bolt 12. The layers 22, 23 are bonded to the sleeve 19 on vulcanization of the latter. In the assembled condition, as shown in FIG. 1, the flanges 20 on the two sleeves 19 are axially pressed by their respective branches 16a, 16b against their associated front surfaces on the member 10, so that a circumferential annular region on the front surface on each annulus 25 bears under a given axial pressure against an abutment surface comprising the respective branch 16a, 16b, respectively, on the strap 16.

The inner surface 22a on the layer 22 is of a regular prismatic shape; in the specific case, the cross sectional profile of this surface is dodecagonal with straight sides, two of the latter being denoted by 22a' and 22a" in FIG. 4. The diameter of the bolt 12 has a value intermediate between the diameters d and D of the circles inscribed and circumscribed, respectively, on the polygonal profile and is in any case so proportioned as to make contact with the sleeve along angularly spaced points and to leave between the bolt and each of the longitudinal edges of the prismatic surface 22a a clearance 24, FIGS. 2 and 4, extending axially of the sleeve from one end of the articulation to the other and connecting at one end with the annular space 25, FIG. 1, between the branch 16a and annulus 23 of polyamide resin, and at its other end with the middle annular space 21. During assembly of the articulation the regions 24 and spaces 21, 25 are filled with a thick lubricant, such as graphitated grease.

In operation the above described articulation distinguishes from prior constructions in the following respect.

In known constructions the lubricant is constantly in a static condition in one or a plurality of supply recesses. When the film of lubricant initially provided between the slidably engaged surfaces is about to be exhausted, the supply recesses are not in a condition to deliver the grease therein in the absence of a dynamic action capable of expelling or pumping therefrom the necessary grease supplement required to maintain lubrication of the said surfaces. In most cases the grease issues from the recesses only on a substantial rising temperature originating from friction and hysteresis of the rubber in operation, that is, when the friction surfaces begin to be deteriorated. Once such deterioration is started, frictions increase and the grease which becomes unduly fluid owing to heating always succeeds in finding a path for flowing away from the articulation.

According to this invention the grease reserves in the cavities 21, 24, 25 are constantly subjected to pulsatory dynamic actions which effect pumping along the edge regions 24. By way of example, when the eye-shaped member 10 in FIG. 1 undergoes a thrust towards the left, the cavity 25 adjacent the branch 16a is somewhat squeezed in an axial direction, the grease therein contained flowing over the edge region 24 towards the middle annular space 21. At the same time the cavity 25 adjacent the branch 16b is released in an axial direction and becomes capable of receiving a small grease supply from the middle space 21 through the edge regions 24 in its respective joint 18. Reverse processes occur when the eye-shaped member 10 undergoes a thrust towards the right. It will moreover be clear that other mutual vibrations of the eye-shaped member 10 and unit 12, 16 effect pumping in a similar manner as described above, whereby the grease reserves are never in a quiescent state, and undergo pulsatory pressures causing the lubricant to flow through all the cavities 21, 24, 25, thereby renewing the lubricant film between the surfaces 22a and bolt 12. It will moreover be clear that pulsations undergone by the annular flared cavities 25 result in renewing lubricant between each of the annuli 23 and its respective strap 16a, 16b without, however, any flow of lubricant to the outside, since the lubricant pressure is released towards the middle annular cavity 21.

It is not strictly necessary for the sides, such as 22a', 22a'' of the polygonal profile to be rectilinear. The said sides can even be curved, as shown at 122', 122'' in FIG. 5, their convexity being turned towards the axis of articulation. The radius R of curvature of these side should, however, always be a substantial one, possibly not smaller than half the diameter d of the inscribed circle, in order to afford, see FIGS. 4 and 5, both a satisfactory support for the bolt 12 and an easy "tailing" of the lubricant from the edge regions 244, 255 by the bolt 12.

The resilient joint shown in FIG. 3 comprises a sleeve 193 in addition to the end flange 203 a further flange 120 at the opposite end, likewise provided with an annular layer 233 of polyamide resin, the arrangement being symmetrical with respect to the middle transverse plane 30. This joint can be employed in the structure shown in FIG. 1 as a substitute for the two joints 18, 18 shown. The lubricant supply is then of course reduced on account of the absence of the middle annular cavity 21.

The joint shown in FIGS. 6 and 7 is similar to the joints 18, 18 in FIG. 1, but for the provision of an inner circumferential lip 32 at the end of the sleeve 196 opposite the flange 206 and resin layer 236. The lip 32 which is integral with the sleeve is of a bead form and merges into the sleeve 19 by a flexible thin annular region 32a integral therewith. The bore of the lip 32 is smaller than the diameter d, FIG. 4, of the circle inscribed in the polygonal contour of the surfaces 226, 226a, 226a', 226a''. It will be seen in FIG. 7 that the lip 32 tightly encircles the bolt 12 preventing escape of lubricant from the supply recesses such as 24, 25, see also FIG. 4.

In the embodiment shown in FIGS. 8 and 9 the rubber sleeve 198 is formed at one end with an integral flange 208 and is lined by a flexible tubular layer 228 of a synthetic resin of polygonal cross sectional shape, the front surface of the flanged end of the sleeve flaring outwardly and having a flexible annular coating 238 of similar resin copying the abovementioned flare, integral with the tubular layer 228 lining the rubber sleeve 198.

The sleeve 198 is formed at its end opposite the flange 208 with a circumferential lip 328 integral with the sleeve, merging into the latter by a flexible thin annular region 328a.

The inner diameter of the lip 328 is smaller than the diameter of the circle inscribed in the polygonal contour of the inner surface of the tubular layer 228.

The circumferential surface of the flange 208 comprises a circumferential lip 40 of a saw-tooth profile.

A disc 41 of a rigid material, such as sheet iron is formed with a central aperture 42 and a circumferential cylindrical flange 43, the axial length of which is intermediate between the thickness of the lip 40 and of the flange 208, respectively.

The diameter of the aperture 42 equals the diameter of the bolt (not shown) in the articulation, the inner diameter of the cylindrical flange 43 being intermediate between the outer diameter of the lip 40 and diameter of the flange 208.

On assembly the cylindrical flange 43 is forced on the lip 40 which is encased by the flange 43 sealing against access of foreign bodies, such as dust and mud, between the disc 41 and layer 238, ultimately between the tubular layer 228 and the bolt in the bore 42.

In operation of the articulation shown in FIGS. 8 and 9, since the resin lining the sleeve is of a modulus of elasticity of an order of about 100 times the modulus of elasticity of the rubber, radial deformations under load actually occur at the expense of the rubber only, so that the annular resin layer 238 follows the radial movements of the bolt.

The annular lip 40 likewise follows the radial movements of the bolt together with the rigid disc 41, the seal against access of foreign bodies being efficient even under substantial radial deformations of the sleeve 198.

What I claim is:

1. A resilient self-lubricating joint comprising a first member having an aperture extending therethrough, a resilient tubular bushing mounted in said aperture and having an axial bore and at opposite ends thereof radial flanges, said bore and flanges extending together axially on said bushing a distance greater than the effective length of said aperture, said radial flanges each having an inner surface abutting on said first member and an outer surface flaring outwardly at an oblique angle from said axial bore and said bushing, means defining abutments bearing on outer marginal edge portions of said radial flanges respectively, said bushing axial bore having a polygonal configuration in cross section, elongated means extending through said axial bore and said abutments making at least line contact axially along said bore at points spaced angularly and defining jointly with said bushing lubricant-receiving, axially extending angularly spaced separate spaces and defining jointly with said abutments and said bushing flanges annular lubricant-receiving spaces at said opposite ends of said bushing outwardly of said flanges and in communication with said axially extending spaces, said axially extending spaces extending the full axial length of said bushing bore to provide said communication with said annular spaces, whereby relative radial movement of said means extending through said bore and said bushing and relative axial movement of said bushing and said abutments causes pumping of lubricant in said spaces thereby to self-lubricate said joint.

2. A resilient self-lubricating joint comprising a first member having an aperture extending therethrough, a resilient tubular bushing mounted in said aperture and having an axial bore and at opposite ends thereof radial flanges, said bore and flanges extending together axially on said bushing a distance greater than the effective length of said aperture, said radial flanges each having an inner annular surface abutting on said first member and an outer annular surface flaring outwardly at an oblique angle from said axial bore and said bushing, means defining abutments bearing on outer marginal edge portions of the outer annular surfaces of said flanges respectively, said bushing axial bore having a polygonal configuration in cross section, elongated means extending through said axial bore and said abutments making at least line contact axially along said bore at points spaced angularly and defining jointly with said bushing lubricant-receiving, axially extending, angularly spaced separate spaces and defining jointly with said abutments and said bushing flanges annular lubricant-receiving spaces at said opposite ends of said bushing outwardly of said flanges and in communication with said axially extending spaces, said axially extending spaces extending the full axial length of said bushing bore to provide said communication with said annular spaces, whereby relative radial movement of said means extending through said bore and said bushing and relative axial movement of said bushing and said abutments causes pumping of lubricant in said spaces thereby to self-lubricate said joint.

3. A resilient self-lubricating joint comprising a first member having an aperture extending therethrough, a resilient tubular bushing mounted in said aperture and having resin-covered inner surfaces defining an axial bore and at opposite ends thereof radial flanges, said bore and flanges extending together axially on said bushing a distance greater than the effective length of said aperture, said radial flanges each having an inner annular surface abutting on said first member and an outer resin-covered annular surface flaring outwardly at an oblique angle from said axial bore and said bushing, means defining abutments bearing on outer marginal edge portions of said radial flanges respectively, said bushing axial bore having a polygonal configuration in cross section, elongated means extending through said axial bore and said abutments making at least line contact with said inner surfaces axially along said bore at points spaced angularly and defining jointly with said bushing lubricant-receiving, axially extending, angularly spaced separate spaces and defining jointly with said abutments and said bushing flanges annular lubricant-receiving spaces at said opposite ends of said bushing outwardly of said flanges and in communication with said axially extending spaces, said axially extending spaces extending the full axial length of said bushing bore to provide said communication with said annular spaces, whereby relative radial movement of said means extending through said bore and said bushing and relative axial movement of said bushing and said abutments causes pumping of lubricant in said spaces thereby to self-lubricate said joint.

4. A resilient self-lubricating joint according to claim 3, in which said resin-covered inner surfaces defining said bore comprise a layer of synthetic, anti-friction resin, and in which said outer resin-covered annular surface flaring outwardly comprises a layer of said synthetic, antifriction resin spaced from the first-mentioned layer of resin.

5. A resilient self-lubricaintg joint according to claim 3, in which said elongated means extending through said bore comprises a bolt circular in cross section, and including means threaded on said bolt for adjustably varying the pressure with which said abutments bear on said radial flanges.

6. A resilient self-lubricating joint according to claim 3, in which said bushing comprises two, coaxial, sleeve portions spaced from each other defining a lubricant-receiving annular space therebetween, each of said sleeve portions having a respective one of said flanges integral therewith.

7. A resilient self-lubricating joint according to claim 3, in which said bushing comprises a sleeve intermediate said flanges and integral therewith.

References Cited in the file of this patent

UNITED STATES PATENTS

| | | |
|---|---|---|
| 1,254,909 | Howe | Jan. 29, 1918 |
| 2,797,929 | Herbenar | July 2, 1957 |
| 2,876,029 | Latzen | Mar. 3, 1959 |
| 3,039,831 | Thomas | June 19, 1962 |
| 3,072,448 | Melton et al. | Jan. 8, 1963 |

FOREIGN PATENTS

| | | |
|---|---|---|
| 12,292 | Australia | May 18, 1934 |